(12) United States Patent
Wetherbee et al.

(10) Patent No.: US 6,243,649 B1
(45) Date of Patent: Jun. 5, 2001

(54) GPS TRUE COURSE GUIDANCE CORRECTION SYSTEM FOR CORRECTING ANTENNA OFFSET ERROR

(75) Inventors: Lisa D. Wetherbee, Campbell; Russ Keller, Sunnyvale, both of CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/365,579

(22) Filed: Aug. 2, 1999

(51) Int. Cl.[7] .............................. G01C 2/00; G01C 17/00; G01S 13/00; G06F 17/00; G06F 19/00
(52) U.S. Cl. ..................... 701/214; 701/213; 701/206; 701/202; 701/116; 702/92; 33/356; 33/357; 342/386; 342/357.08
(58) Field of Search ........................... 701/214, 213, 701/206, 116, 202; 114/144 B, 144 A, 144 E; 702/92; 33/356, 357; 342/357.08, 386

(56) References Cited

U.S. PATENT DOCUMENTS

| | | | |
|---|---|---|---|
| 5,343,209 | * | 8/1994 | Sennott et al. .................... 342/357 |
| 5,491,636 | * | 2/1996 | Robertson et al. ................. 364/432 |
| 5,884,213 | * | 3/1999 | Carlson ............................ 701/206 |
| 5,987,383 | * | 11/1999 | Keller et al. ..................... 701/213 |
| 6,014,610 | * | 1/2000 | Jugde et al. ...................... 702/92 |

* cited by examiner

Primary Examiner—William A. Cuchlinski, Jr.
Assistant Examiner—Ronnie Mancho
(74) Attorney, Agent, or Firm—Wagner, Murabito & Hao LLP

(57) ABSTRACT

A method for correcting yaw in a DGPS (global positioning system) based guidance system mounted on a vehicle. The method corrects for a yaw induced heading/cross track error due to a DGPS antenna being mounted a significant distance from the point of operation (e.g., the vehicle operator's location, the center of the vehicle, etc.). The method determines a ground track of a vehicle using a DGPS system and a coupled antenna mounted on the vehicle. A heading of the vehicle is also determined using a compass mounted on the vehicle. The heading and the ground track are compared to determine whether a difference exits and the magnitude of the difference. Using the difference, the DGPS determined position is adjusted to be the position of the operator/center of the vehicle. Using this guidance information, an indication is generated operable for directing the vehicle to maintain a desired ground track. The indication is generated such that it compensates for the difference between the ground track at the point of operation and the desired ground track. The indication is generated to compensate for the specific mounting location of the DGPS antenna on the vehicle. In so doing, the indication properly directs the vehicle to maintain the desired ground track regardless of any yaw, crab, etc., of the vehicle, or any offset of the DGPS antenna due thereto.

20 Claims, 12 Drawing Sheets

601

$R_{cme} = R_{GPS} - \vec{C}_{en} \vec{C}_{eb} \vec{L}_b$ $C_{en}$ = matrix formulation example $$M_{en} = \begin{bmatrix} X(0) & Y(0) & Z(0) \\ X(1) & Y(1) & Z(1) \\ X(2) & Y(2) & Z(2) \end{bmatrix}$$

$\vec{Z}$ = - unit vector $(\vec{R}_e)$ $\vec{Y}$ = unit vector $(\vec{V}_e \times \vec{R}_e)$ $\vec{X}$ = unit vector $(\vec{Y} \times \vec{Z})$

602

Q $C_{nb}$: quaternion formulation example $\alpha_1 = \dfrac{yaw}{2}$ in radians $\alpha_2 = \dfrac{pitch}{2}$ in radians $\alpha_3 = \dfrac{roll}{2}$ in radians Q angle = $\cos\alpha_3 \cos\alpha_2 \cos\alpha_1 + \sin\alpha_3 \sin\alpha_2 \sin\alpha_1$ Q vector $[0] = \cos\alpha_3 \sin\alpha_2 \sin\alpha_1 - \sin\alpha_3 \cos\alpha_2 \cos\alpha_1$ $[1] = \cos\alpha_3 \sin\alpha_2 \cos\alpha_1 - \sin\alpha_3 \cos\alpha_2 \sin\alpha_1$ $[2] = \cos\alpha_2 \cos\alpha_2 \sin\alpha_1 + \sin\alpha_3 \sin\alpha_2 \cos\alpha_1$

*Note - Pitch and roll values are zero for a system with only a heading sensor.

GPS TRUE COURSE GUIDANCE CORRECTION SYSTEM FOR CORRECTING ANTENNA OFFSET ERROR

TECHNICAL FIELD

The present invention relates generally to the alignment of centerline guidance by correcting for antenna offset, for the dispensing of chemicals to agricultural fields by aircraft. More specifically, the present invention pertains to a high accuracy GPS (Global Positioning System) based method and system for efficiently dispensing chemicals to agricultural fields.

BACKGROUND ART

Vehicles traveling along a path are sometimes subject to external forces that force the vehicle to change its apparent heading in order to compensate for this external force. Examples include a pilot attempting to maintain a desired ground track in the presence of cross winds, a boat maintaining a straight course in the presence of a cross current, and the like. In so doing, when using guidance to obtain a heading that will lead to an intended target, this direction of travel does not always agree with the vehicle's heading. Piloted vehicles are guided by the driver or pilot to maintain a desired course, correcting for the apparent heading/cross track error. The driver or pilot of the vehicle needs to have some way to correct for this inaccuracy.

The pilot/driver of the vehicle usually relies on one or more heading or guidance instruments to assist in compensating for the apparent heading error and/or cross track error. Using the indications for the guidance, the pilot directs the vehicle, through steering inputs, to maintain a desired ground track, often with varying degrees of success. Inaccurate corrections for this heading error and/or cross track error leads to the vehicle's deviation from the specified course (e.g., actual ground track deviating from desired ground track). Depending upon the application, this can have numerous adverse consequences (e.g., maritime navigation, aerial application of agricultural chemicals, etc.).

For example, in aerial application of agricultural chemicals, such as fertilizers, herbicides, and pesticides (sometimes referred to as "crop dusting") it is very important to fly parallel lines in order to prevent overlap and skip of material applied. Aerial application of agricultural chemicals is the term generally used for the dispensing of chemicals (e.g., fertilizers, pesticides, and the like) to an agricultural field (e.g., field crops, orchards, etc.) from dispensing vehicle (e.g., helicopter). During aerial application, the dispensing vehicle makes numerous sequential passes, dispensing chemicals in a swath across the field in each pass. The helicopter's pilot carefully follows a flight path which ensures that each successive swath over the field is correctly spaced, distance wise, from the adjacent swath in order to avoid gaps or overlaps in coverage. For example, should one swath occur too far from an adjacent swath, the area of the field will not receive an sufficient amount of chemicals (e.g., pesticides, fertilizer, herbicides, and the like). Similarly, should one swath occur too close to an adjacent swath, the overlap area receives excessive amounts of chemicals. This can prove very expensive to the farmer. The crops of the field can be damaged or rendered unusable.

Modern agriculture-type applications use GPS systems to provide course and guidance information. The GPS information is used to control indicators (e.g., Course Deviation Indicator, lightbars, etc.) to allow the pilot/driver to determine correct steering adjustments. However, there exists a particular problem with helicopters. The location of the GPS antenna tends to cause errors in the guidance indications generated therefrom. The position/orientation is determined with respect to the GPS antenna. While in most implementations, the GPS antenna is mounted near the center of the vehicle, the location of helicopter rotor blades may force the location of the GPS antenna outside the arc of the rotor blades at the end of the tail boom, or other point away from the rotor blades. This is to prevent obscuration of the GPS and/or differential correction signals by the spinning rotor blades. Although GPS signals can often be tracked through the spinning rotors, the differential correction signals often cannot (especially those differential correction signals broadcast from satellites). Thus, an integrated GPS/DGPS antenna is often mounted on the tail boom or other appendage, clear of the arc of the spinning rotors.

This creates a problem however, in that the position and guidance information is determined with respect to the location of the antenna. The antenna is located a significant distance away from the center of the helicopter. This leads to significant errors when attempting to correct for flight deviations or adverse winds, or other changes in attitude. For example, helicopters "crab" into the wind to maintain a constant desired ground track in the presence of cross winds. As such, the tail boom is angled away from the center line, "off center" from the desired ground track with respect to the rest of the aircraft. This leads to errors in instrument readings, and unless consciously compensated for by the pilot, errors in course corrections.

Optimal antenna location for guidance applications is near the center of rotation where the vehicle operator is located so the guidance corrections are applicable to the operator's location. The operator can then make the necessary course adjustments based on this information without having to mentally compensate for any heading/cross track error due to the difference between the operator's location, or the vehicle's center of rotation, and the antenna location.

If the optimal antenna location is not practical (i.e., rotor blade interference, obscuration, etc. as described above) then adjustments need to be made to account for the vector between the antenna location and the point where the DPGS determined position is needed for guidance (i.e., the operator's location, the center of spray location, etc.). In further discussions herein this point is referred to as the point of operation. For example, adjustments accounting for the vector between the antenna location and the vehicle's center of rotation. This vector is referred to as a lever arm.

Prior art FIG. 1 is a diagram showing a helicopter 100 flying a ground track 101 (course 000). A differential GPS (DGPS) antenna 103 is mounted on the tail boom of helicopter 100. FIG. 1 also depicts a guidance indicator 150 (e.g., a course deviation indicator, or CDI) as seen by the pilot and a compass heading 110 (e.g., showing a heading of 010) as seen by the pilot.

As shown in FIG. 1, there is a cross wind component 120 (e.g., a 045 wind at 15 knots), the helicopter needs to crab slightly into the wind, in order to maintain the desired ground track. As described above, this crab (e.g., yaw, or applied wind correction angle, with respect to the ground track 101) can offset the guidance antenna location relative to the aircraft's course over ground. This is shown in FIG. 1 as antenna offset 102 (1 meter) and offset angle 104. The offset (the combined effect of antenna offset 102 caused by offset angle 104) can adversely affect the guidance system of the aircraft, giving the pilot an erroneous reading. This is shown by guidance indicator 150 showing the 1 meter offset error with respect to ground track 101. Thus, even though ground track 101 may exactly match a desired ground track, the guidance indicator 150 indicates a course error to the pilot, due to the antenna offset.

It should be noted that this problem is not limited to helicopters alone. For example, other vehicles having GPS antenna locations with a significant offset from the point of operation can experience similar offset induced erroneous readings. One such example would be a ship at sea (e.g., having a stern mounted GPS antenna) having to steer into a current in order to travel a straight line. For example, the ship may have to steer a course of 350° in order to travel in a direction of 360° if there is a mild current from the left. This crab into the current can offset guidance provided by onboard instruments that rely on the ship's heading to provide course information.

Prior art FIG. 2 shows helicopter 100 flying a desired ground track 101 while experiencing a direct head wind 121. In those cases where helicopter 100 is flying straight into or with the wind, there is no error due to crab. As depicted in FIG. 2, helicopter 100 is flying directly into a head wind 121. The direction of the wind 121 is parallel to the ground track 101. Hence, the heading flown by the helicopter 100 matches that of the ground track. There is no significant offset of the GPS antenna, and hence, guidance indicator 150 correctly indicates that helicopter 100 is "on course".

Thus, what is required is a solution that gives correct indications regardless of the attitude of a vehicle (e.g., wind induced yaw, current-induced yaw, etc.). What is required is a solution that properly takes into account the offset caused by the mounting location of a GPS antenna on a vehicle. What is required is a solution that compensates for offset errors due to antenna location and vehicle heading changes. The required solution should be efficiently implemented such that it does not require the installation of additional expensive hardware (e.g., separate GPS and DGPS antennas, inertial measurement systems, etc.). The present invention provides a novel solution to these requirements.

DISCLOSURE OF THE INVENTION

The present invention provides a solution for compensating for the offset caused by the mounting location of a GPS antenna on a vehicle. The present invention provides a method and system that compensates for offset errors due to antenna location and vehicle heading changes. The present invention can be efficiently implemented and does not require the installation of additional expensive hardware (e.g., separate GPS and DGPS antennas, inertial measurement systems, etc.).

In one embodiment, the present invention is implemented as a system for correcting yaw in a differential GPS (global positioning system) based guidance system mounted on a helicopter. The method determines a ground track of a helicopter using a differential GPS (DGPS) system and a magnetic compass, and generates proper indications (e.g., guidance displays for the pilot) to direct the helicopter to maintain a desired ground track The indications are generated such that they automatically compensate for changes in heading (e.g. yaw) due to, for example, cross winds or maneuvering. Hence, the pilot of the helicopter (or autopilot) is able to maintain the desired ground track (also referred to as course over ground) in the presence of varying heading.

The DGPS system uses a GPS+DGPS antenna in a single housing mounted on the tail boom of the helicopter (hereafter often referred to simply as DGPS antenna). In so doing, the antenna avoids the obscuration problems associated with the spinning main rotor blades of the helicopter. The heading of the helicopter is determined using a mounted compass (e.g., flux gate compass). The heading (obtained from the compass) and the ground track are compared to determine whether a difference exists and the magnitude of the difference. Using the difference, the indication (for the guidance displays) is generated. The indication is generated such that it compensates for any heading/cross track error. Additionally, the indication also compensates for the specific mounting location of the DGPS antenna on the tail boom of the helicopter. Since the tail boom is a significant distance from the point of operation, changes in heading significantly affect the location of the DGPS antenna (from which DGPS positions are determined) with respect to the ground track of the helicopter. The indication is generated such that it properly takes into account the antenna location. In so doing, the indication properly directs the helicopter to maintain the desired ground track regardless of any yaw, crab, etc., of the helicopter, or any offset of the DGPS antenna due thereto.

BRIEF DESCRIPTION OF THE DRAWINGS

The accompanying drawings, which are incorporated in and form a part of this specification, illustrate embodiments of the invention and, together with the description, serve to explain the principles of the invention:

Prior art

Prior art

FIG. 6 shows a third portion of the computations implemented by a guidance system in accordance with one embodiment of the present invention.

DETAILED DESCRIPTION OF THE INVENTION

Reference will now be made in detail to the preferred embodiments of the invention, a GPS true course guidance correction system for correcting antenna offset error, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail so as not to obscure aspects of the present invention unnecessarily.

The present invention provides a solution for compensating for the offset caused by the mounting location of an integrated GPS/DGPS antenna on a vehicle. The present invention provides a method and system that compensates for offset errors due to antenna location and vehicle heading changes. The present invention can be efficiently implemented and does not require the installation of additional expensive hardware (e.g., separate DGPS and GPS antennas, inertial measurement systems, etc.).

Figure 4:
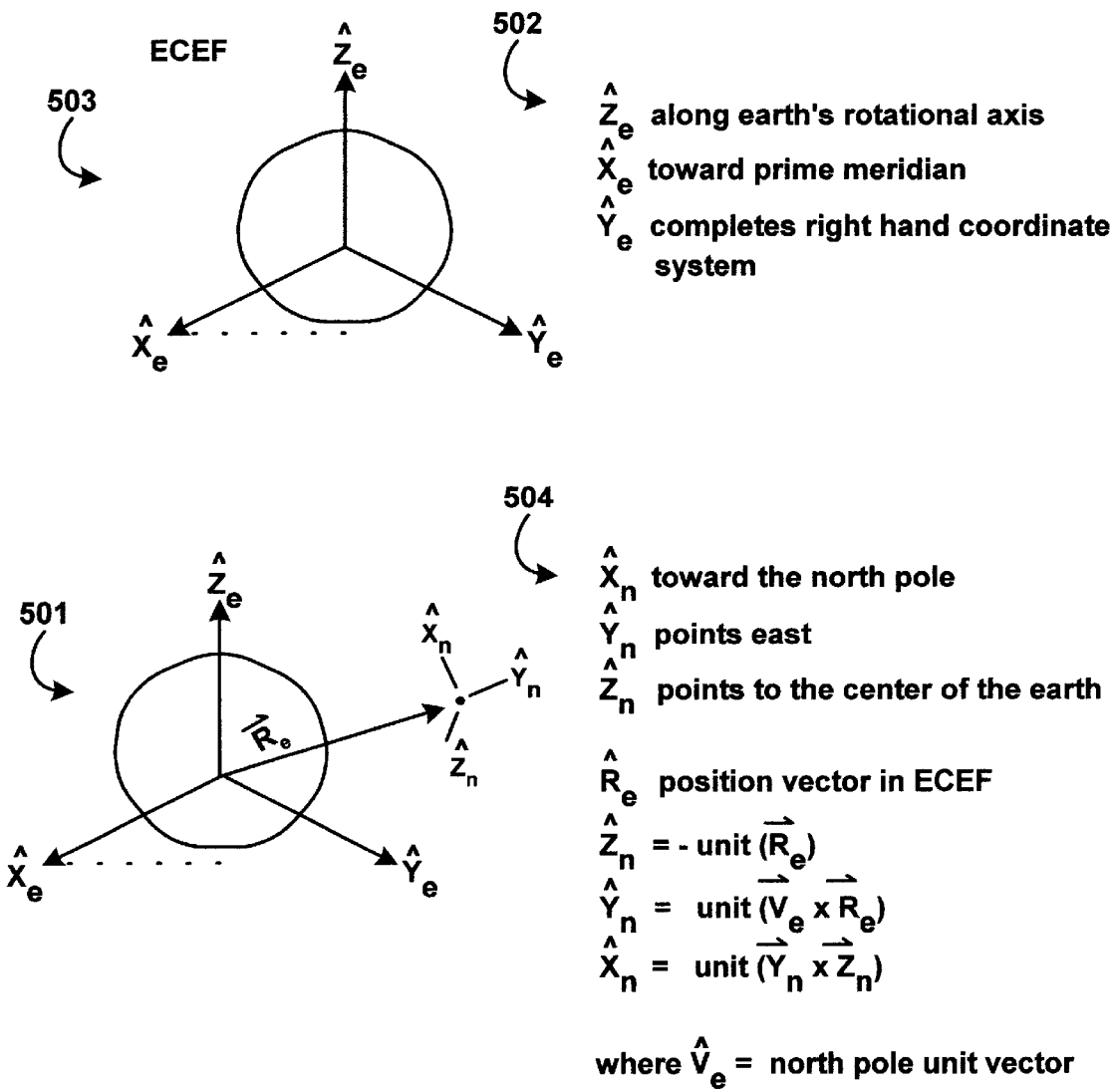
FIG. 4 shows a first portion of the computations implemented by a guidance system in accordance with one embodiment of the present invention.

In one embodiment, the present invention is implemented as a system for correcting yaw in a GPS (global positioning system) based guidance system mounted on a helicopter (e.g., discussed in FIG. 4). The method determines a ground track of a helicopter using a GPS system, and generates proper indications (e.g., guidance displays for the pilot) to direct the helicopter to maintain a desired ground track. The indications are generated such that they automatically compensate for changes in heading (e.g., yaw, etc.) due to, for example, cross winds or maneuvering. Hence, the pilot of the helicopter (or autopilot) is able to maintain the desired ground track in the presence of varying headings.

In so doing, the present invention accounts for the error inducing conditions often experienced by, for example, helicopters used for agricultural applications. For example, a GPS guidance system in accordance with one embodiment of the present invention gives the pilot of an aerial application helicopter precise steering indications on, for example, a CDI, allowing the pilot to control the helicopter to precise points of entry onto an agricultural field for aerial application. The GPS guidance system ensures the guidance instrument references (e.g., the CDI) accurately indicate errors in the helicopter's ground track with respect to a planned desired ground track regardless of cross winds, yaw, etc. The accurate guidance enables the accurate dusting of the entire crop without any gaps or overlaps, and for example, without requiring the aerial application helicopter to fly through its own spray.

Figure 3:
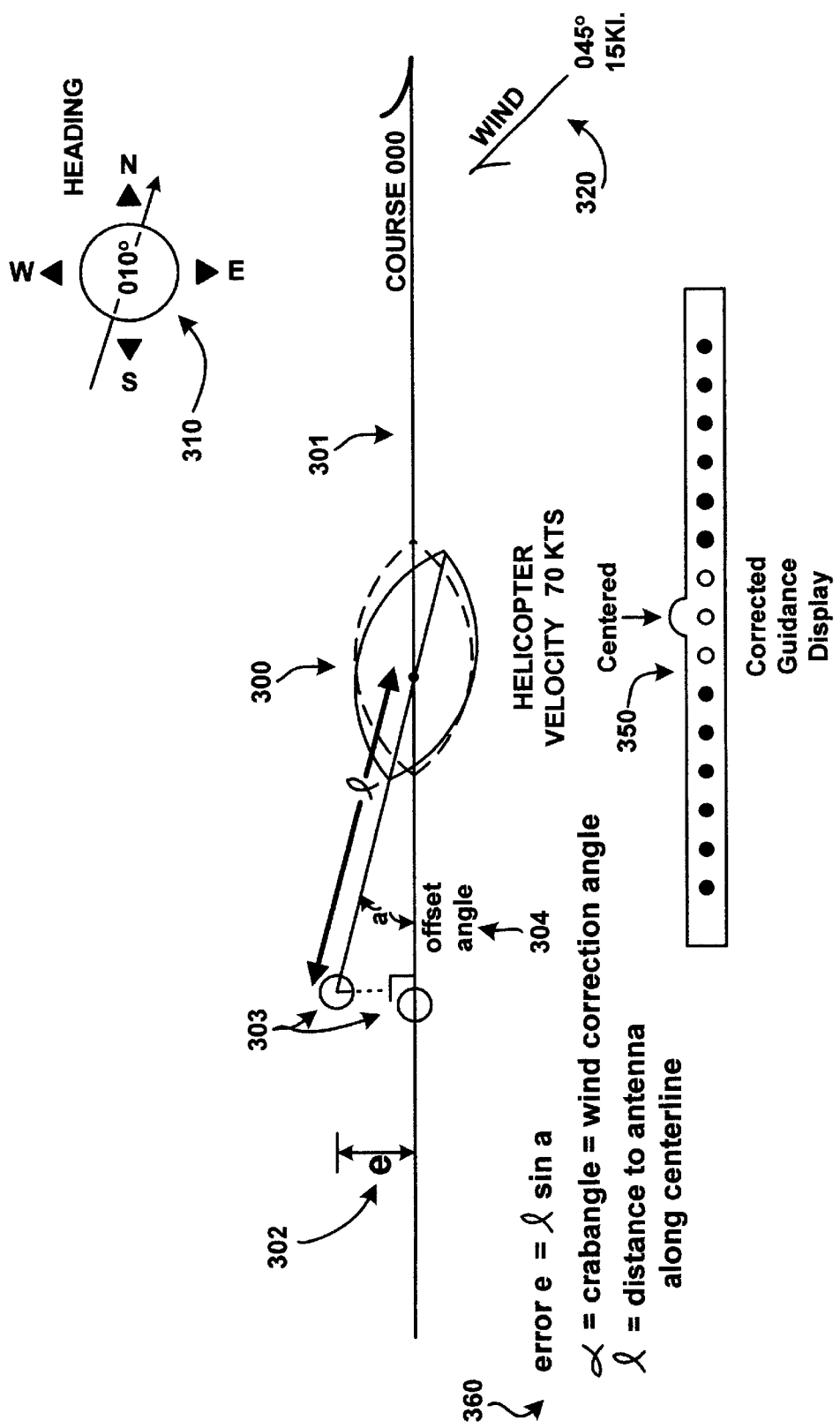
FIG. 3 shows a diagram of a helicopter 300 flying a ground track 301 (course 000) in the presence of a cross wind, while using a guidance system in accordance with one embodiment of the present invention.

Referring now to FIG. 3, a diagram of a helicopter 300 flying a ground track 301 (course 000) is shown. An integrated GPS and DGPS antenna 303 is mounted on the tail boom of helicopter 300 (shown as DGPS antenna 303). FIG. 3 also depicts a guidance indicator 350 (e.g., a course deviation indicator, or CDI) as seen by the pilot and a compass heading 310 (e.g., showing a heading of 010) as seen by the pilot. A legend 360 is shown on the left side of FIG. 3.

As shown in FIG. 3, there is a cross wind component 320 (e.g., a 045 wind at 15 knots), the helicopter needs to crab slightly into the wind, in order to maintain the desired ground track. This crab (e.g., yaw with respect to the ground track 301) offsets the DGPS antenna 303 location relative to the aircraft's course over ground. This is shown in FIG. 3 as antenna offset 302 (e.g., "e") and offset angle 304 (e.g., "a"). In the prior art, the offset (the antenna offset 302 caused by offset angle 304) can adversely affect the guidance system of the aircraft, giving the pilot an erroneous reading. However, in accordance with the present invention, the guidance system of the present invention automatically compensates for this error and shows a corrected guidance display to the pilot. This is shown by guidance indicator 350 showing the helicopter being on course with no significant cross track error (e.g., ground track 301 matching the desired ground track) regardless of the offset 302 of the DGPS antenna 303 due to cross wind 320. Thus, even though there may be significant offset of the DGPS antenna with respect to the ground track (e.g., ground track 301 and offset 302), the guidance indicator 350 indicates the true, corrected course error, if any, to the pilot. In the case of an aircraft, this correction is also referred to as the wind correction angle.

It should be noted that the problem of correcting for antenna offset is not limited to helicopters alone. For example, other vehicles having GPS antenna locations with a significant offset from the point of operation can be similarly corrected by a system in accordance with one embodiment of the present invention. One such example is a ship at sea (e.g., having a stern mounted GPS antenna) having to steer into a current in order to travel a straight line. A system in accordance with the present invention would automatically compensate for the ship's heading, for example, where the ship may have to steer a course of 350° in order to travel in a direction of 360° when experiencing a cross current from the left. In such a case, the offset due to the crab into the current is automatically corrected by the system of the present invention such that onboard guidance instruments correctly reflect the ships track with respect to an optimal track and whether any significant cross track error exists.

In the present embodiment, the correcting for offset processing is performed in a computer system. The computer system uses heading information (e.g., heading 310) from, in the present embodiment, a flux gate compass, and preprogrammed information regarding the mounting location of the DGPS antenna on the helicopter's body, shown in FIG. 3 as lever arm "l" 305, to compute the corrected guidance indication shown on guidance display 350. In the present embodiment, position information is obtained via DGPS while the heading information is obtained via flux gate compass.

Using the heading information and the position information (e.g., the actual ground track of DGPS antenna 303), the computer system computes the required compensation necessary to show a corrected indication to the pilot on guidance indicator 350. One example of the computations required to generate the corrected indication is shown in FIGS. 4 through 6 below.

Figure 5:
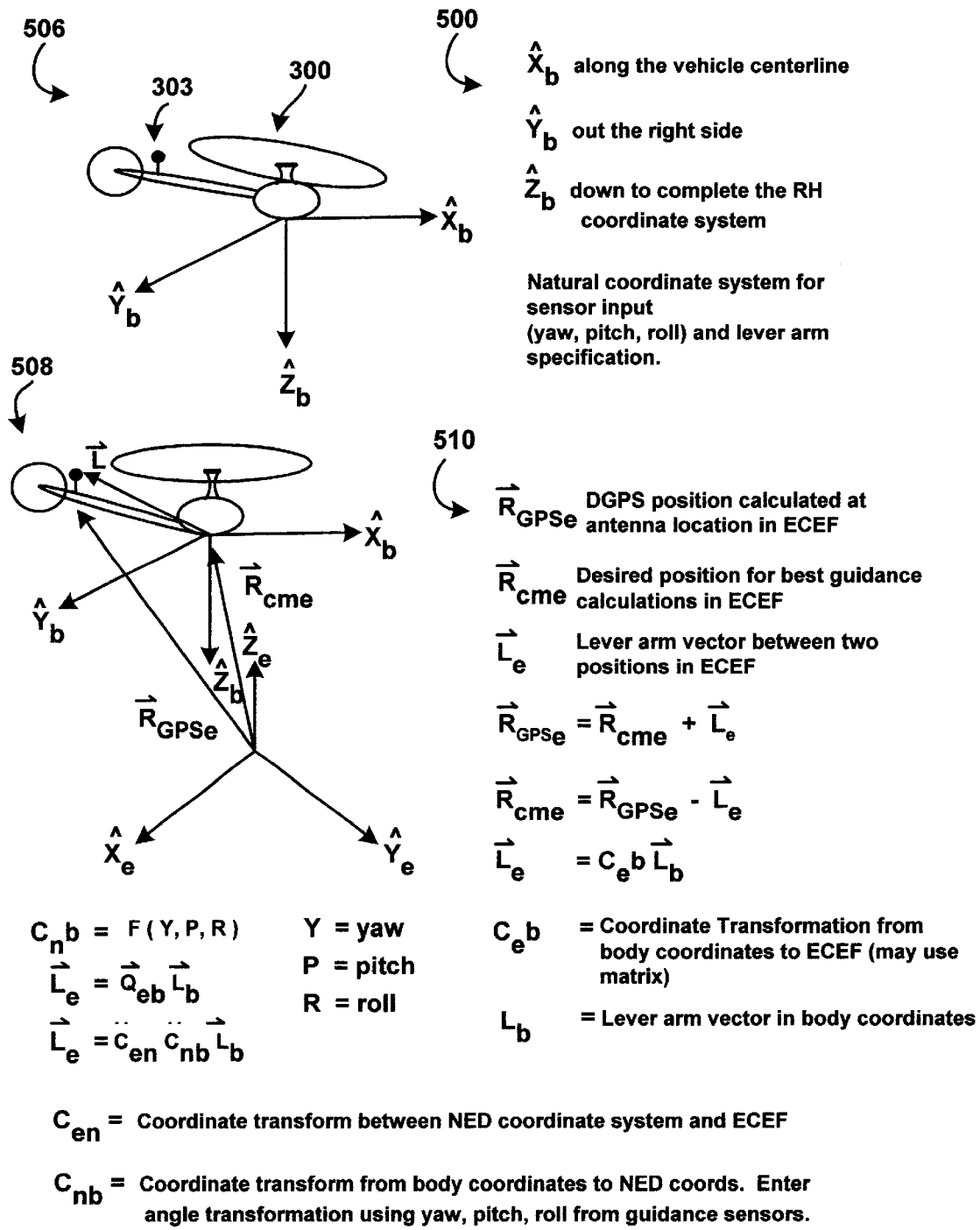
FIG. 5 shows a second portion of the computations implemented by a guidance system in accordance with one embodiment of the present invention.

With reference now to FIGS. 4–6, one implementation of the computation process used by one embodiment of the present invention is shown. Referring to FIG. 4, FIG. 4 shows an earth centered earth fixed (ECEF) coordinate system 501 typically used to define DGPS coordinates. A legend 502 for the ECEF system is shown on the left side of FIG. 4. As shown by legend 502, ECEF system 501 has a $z_e$ axis along the earth's rotational axis, an $x_e$ axis toward the prime meridian, and a $y_e$ axis completing the right handed Cartesian coordinate system in accordance with the "righthand rule." These coordinates need to be transformed into a north-east-down (NED) coordinate system 503. A legend 504 is shown for the NED coordinate system. The axes, $X_n$, $y_n$, $z_n$, of NED coordinate system 503 are as shown in legend 504. Legend 504 also defines a position vector R for the location of helicopter 300 in ECEF coordinates.

FIG. 5 shows a body coordinate system 506 of the helicopter 300 and a corresponding legend 507. The configuration and layout of helicopter 300 is defined in terms of body coordinate system 506 ($x_b$, $y_b$, $z_b$). Specifically, body coordinate system 506 is used to define the location of DGPS antenna 303. Body coordinate system 506 is the "natural" coordinate system for sensor input from the various sensors onboard helicopter 300 (e.g., guidance indicators, compass, etc.). FIG. 5 also shows a diagram 508 that graphically depicts the transformations required to express the location of DGPS antenna 303 in ECEF coordinates, using the NED frame as an intermediate calculation. The vector $L_e$ expresses the location of the DGPS antenna 303 with respect to the center of helicopter 300 in ECEF coordinates. The term $C_{eb}$ expresses the coordinate transformation from body coordinates to ECEF coordinates. The term $C_{en}$ expresses the transformation from NED to ECEF coordinates. The term $C_{nb}$ expresses the transformation from body coordinates to NED coordinates (Euler angle transformation using yaw, pitch, and roll from guidance sensors).

FIG. 6 depicts a legend 601 showing example matrix equations used to accomplish the transformation (e.g., the term $M_{en}$). FIG. 6 also shows a legend 602 showing an example quaternion formulation example for accomplishing the required transforms. As discussed above, these transformations describe the relationship between the body coordinates of the DGPS antenna 303 with the ECEF coordinates of DGPS antenna 303 and with the location of DGPS antenna 303 from the center of helicopter 300.

Figure 7:
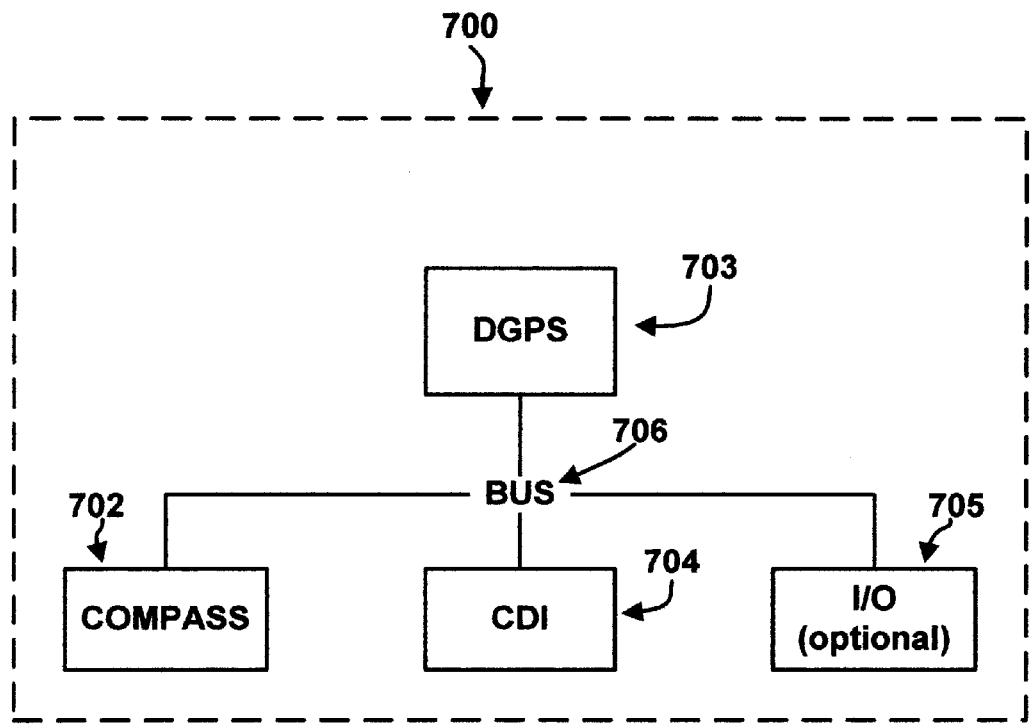
FIG. 7 shows the components of a guidance system in accordance with one embodiment of the present invention.

FIG. 7 shows a system 700 in accordance with one embodiment of the present invention. System 700 includes a DGPS receiver 703, a CDI 704 (course deviation indicator), a compass 702, and an input output unit (I/O) 705, each coupled to a bus 706. Compass 702 provides magnetic heading information and an optional I/O unit 705 is included to provide connectivity with any external components. In this embodiment, DGPS receiver 703 receives heading information from compass 702, corrects for offset as described above, and provides corrected positioning information, guidance, and navigation data to CDI 704, which in turn, displays corrected guidance information to the pilot (e.g., helicopter 300 in which system 700 is installed).

In the present embodiment, DGPS receiver 703 functions by determining a present position, ground track, and ground speed of an aircraft in which system 700 is installed (e.g., aircraft 501 of FIG. 5). DGPS receiver 703 contains sufficient computational resources to execute various software routines which implement the functionality of the present invention. Accordingly, DGPS receiver 703 is adapted to process the heading information provided by compass 702 and the body coordinates of compass 702 with the DGPS positioning information to correct for any offset error.

CDI 704 functions as a guidance indicator for a pilot of the aircraft. CDI 704 displays the desired flight path and any deviations therefrom to the pilot. As described above (e.g., FIG. 3), by following the indicators of CDI 704, the pilot is able to guide the aircraft along the desired flight path, thereby maintaining a desired ground track. Deviations from the desired ground track are indicated, allowing the pilot to make corresponding course corrections.

The optional I/O component 705 functions by providing for connectivity of system 700 with any external navigation electronics or other devices. In the present embodiment, I/O 705 is a removable storage device for uploading and downloading information to and from system 700 via removable media (e.g., floppy disks, removable hard disks, flash memory cards, etc.). However, I/O 705 could alternatively be a port (e.g., RS-232, USB, IEEE1394, CAN bus, etc.) for coupling to other navigation instruments, or some other device providing a means of inputting and outputting information to and from system 700.

Bus 706 functions by communicatively coupling the components of system 700 together. The components communicate electronically via bus 706, using an appropriate bus protocol (e.g., USB, MilStd 1553, J1939/ISO 11783, or the like). Additional optional components are added to system 700 by coupling them to bus 706. As needed by the particular requirements of the user, the operating software of system 700 can be modified to take advantage of the added components. In this manner, bus 706 provides a means of extending the functionality of system 700 as the requirements of the user change.

Figure 8:
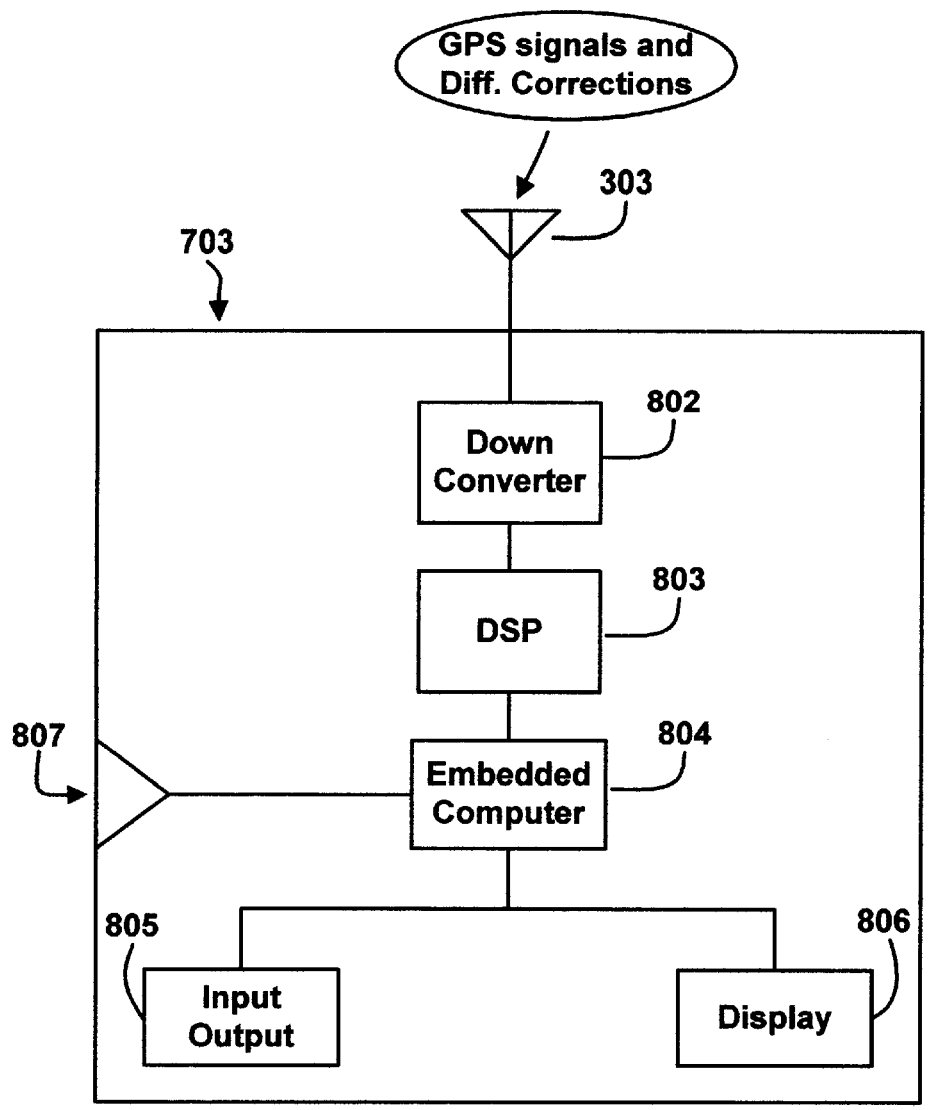
FIG. 8 shows a DGPS receiver in accordance with one embodiment of the present invention is shown.

Referring now to FIG. 8, a DGPS receiver 703 in accordance with one embodiment of the present invention is shown. DGPS receiver 703 is designed to function with GPS satellites 1101 of FIG. 11. DGPS receiver 703 receives GPS signals from GPS constellation 1100 via antenna 303. The GPS signals are down converted, via down converter 802, then de-spread and demodulated by the digital signal processor (DSP) 803, and passed to an internal embedded computer 804, which computes the correct pseudo ranges and determines the GPS-based position. The DGPS receiver similarly down-converts and processes signals via beacon broadcast, satellite broadcast and the like. These corrections are applied to the GPS data to improve the accuracy of the GPS measurements and position. Information can be communicated to the user via an optional display coupled to the embedded computer 804 built into DGPS receiver 703. In the present embodiment, display 806 and CDI 704 (of FIG. 7) are both adapted to present position and navigation information to the pilot.

The DGPS receiver 703 can be configured via an optional user input output 805 (e.g., a keyboard or joystick). Accordingly, DGPS receiver 703 can receive navigation information or the like via input output 805 or via I/O component 705 and bus 706 (of FIG. 7). The DGPS-based position and other navigation information are communicated to system 700 via communications port 807. Communications port 807 couples DGPS receiver 703 to bus 706. Additionally, communications port 807 can be one of many well known interface standards in use in the electronics field (e.g., RS-232, ARINC 429, ARINC 629, Milstd 1553, J1939/ISO11783, CAN bus, and the like).

Figure 1:
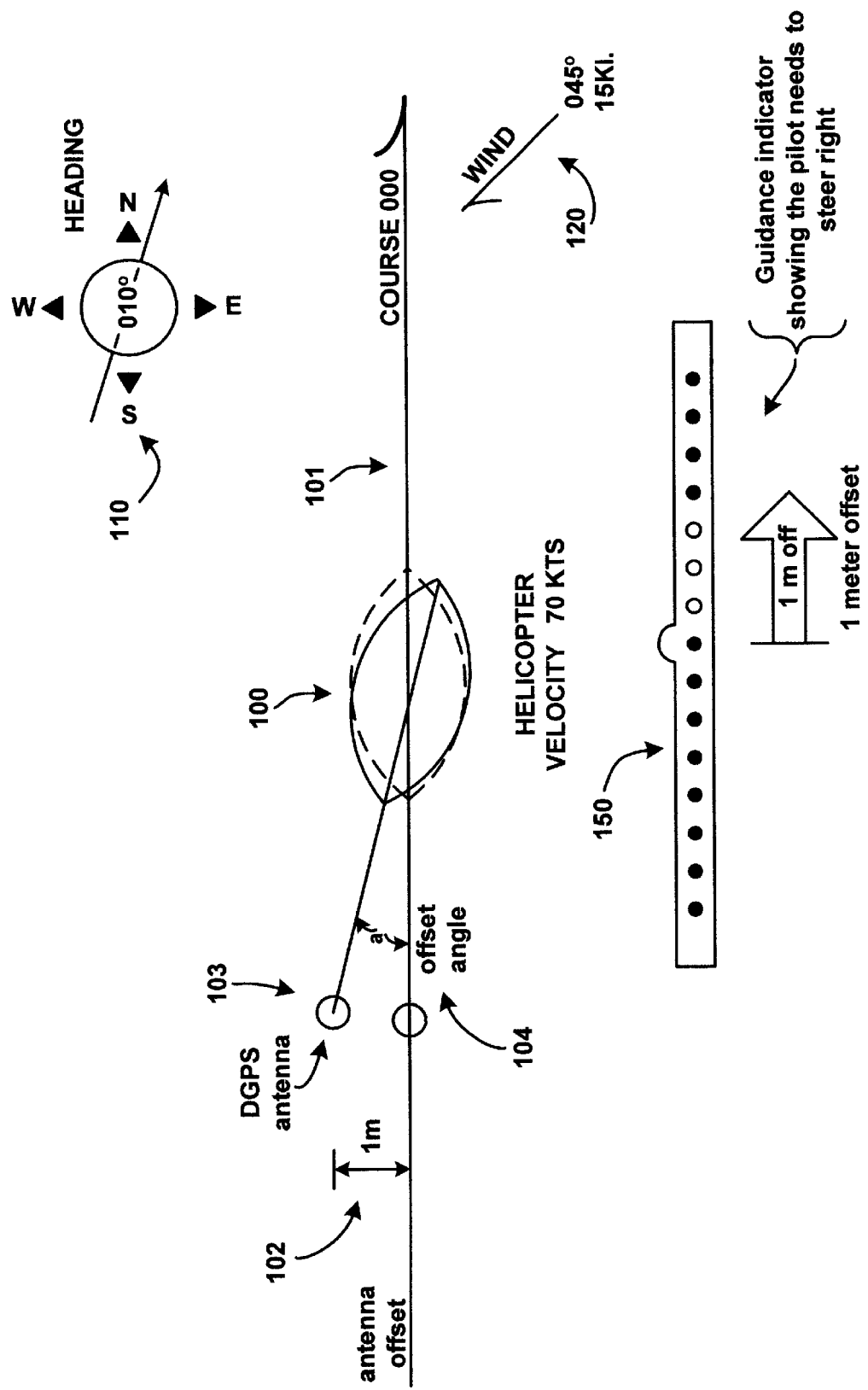
FIG. 1 shows a diagram showing a helicopter flying a ground track (course 000) while experiencing a cross wind.
Figure 2:
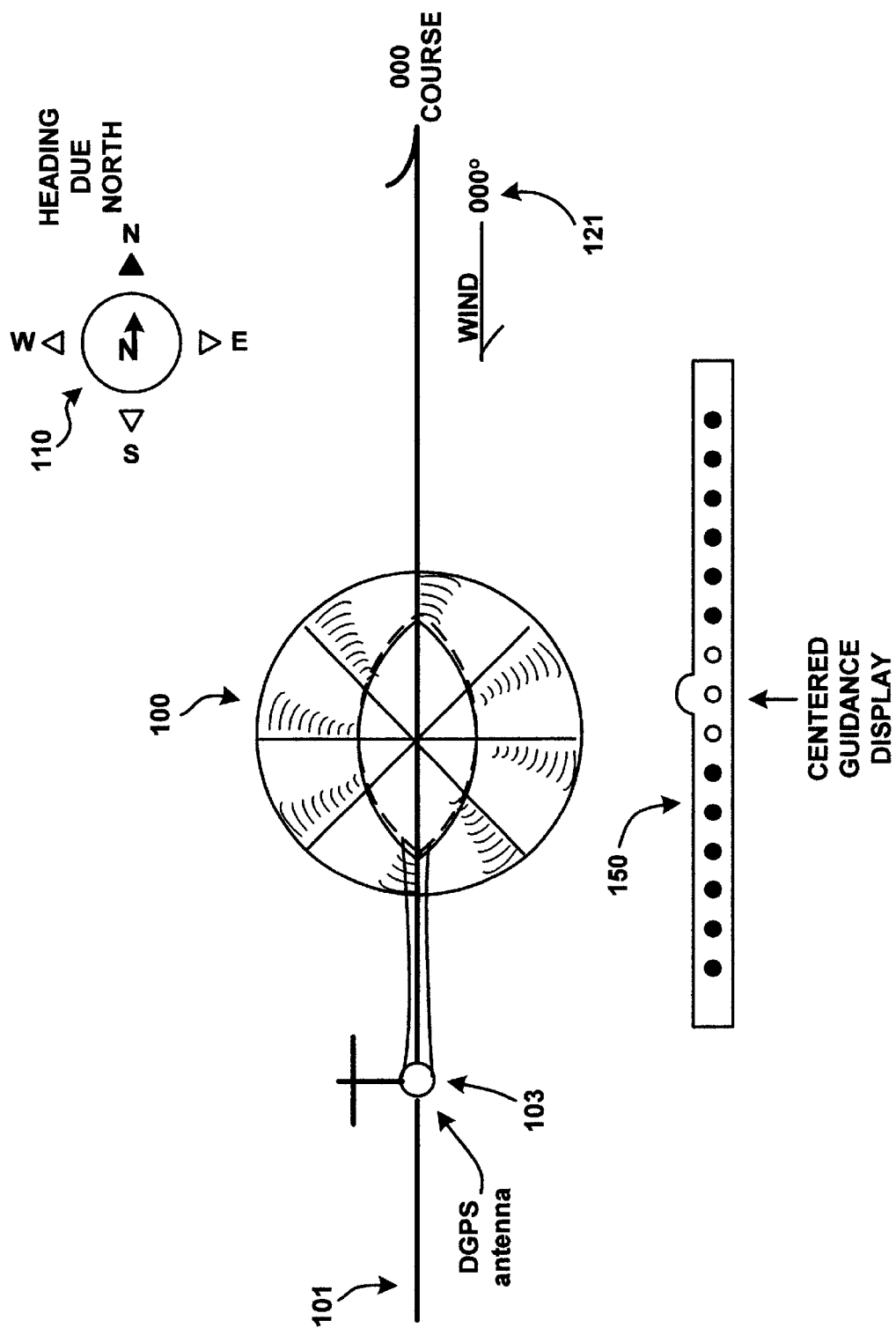
FIG. 2 shows helicopter flying a desired ground track while experiencing a direct head wind.
Figure 9:
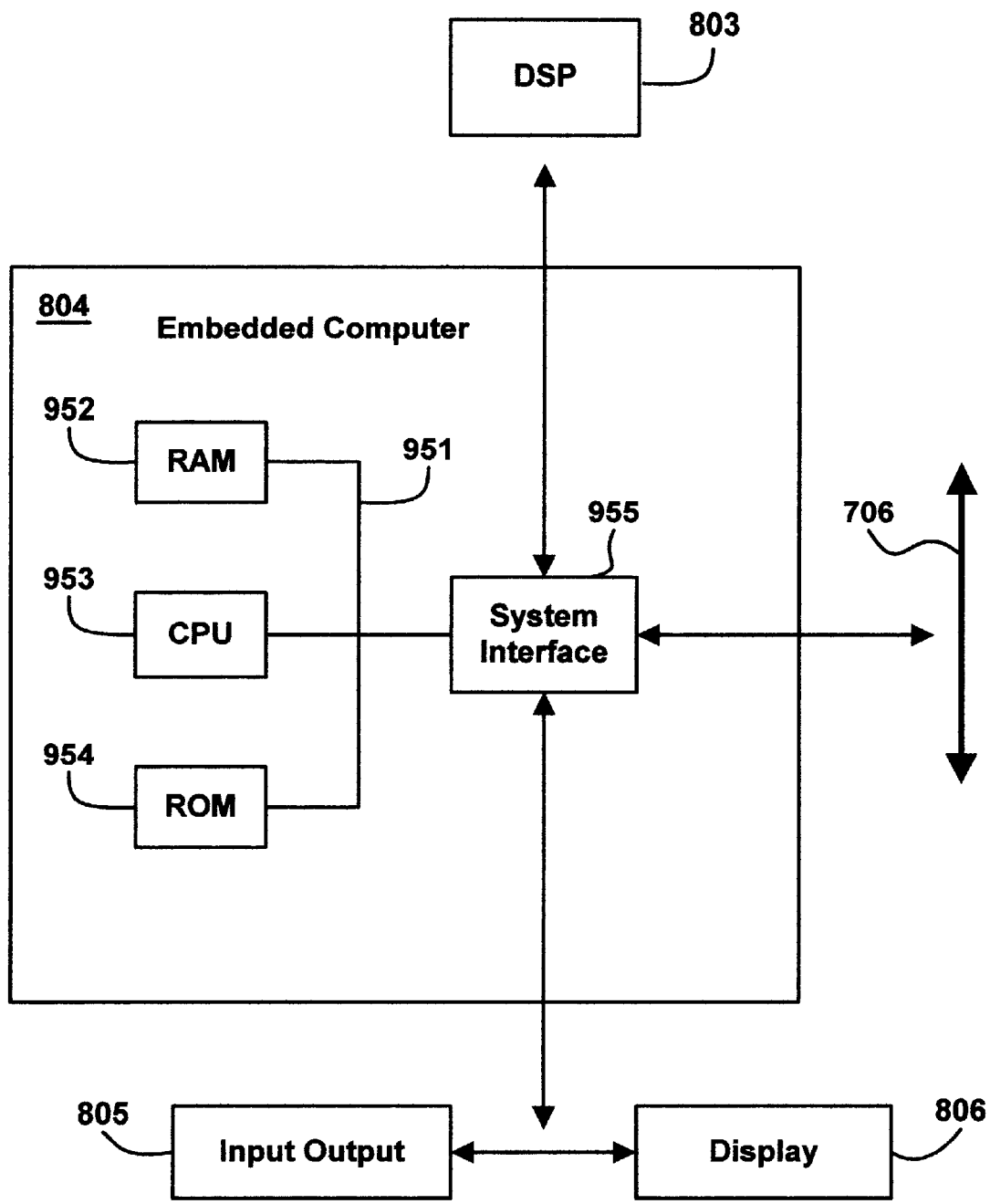
FIG. 9 shows a more detailed diagram of an embedded computer in accordance with one embodiment of the present invention of the system shown in FIG. 8.

FIG. 9 shows a more detailed diagram of embedded computer 804 of FIG. 8. As described above, DGPS receiver 203 includes sufficient computational resources to host software programs which implement many features and functions of the present invention. In the present embodiment, this software is executed on the computer system platform provided by embedded computer 804. The software interacts with the other components of system 200 of FIG. 2 via message passing and communication protocols of port 807 and bus 206. Specifically, it should be appreciated that aspects of the present invention, described herein, are discussed in terms of functions or steps executed on a computer system platform. Although a variety of different computer systems can be used with the present invention, an exemplary general purpose computer system is shown in the embedded computer 804 of FIG. 9. It should further be appreciated that alternatively, any other one or more components of system 200 (e.g., CDI 204) can include the necessary computational resources and thereby provide a computer system platform for executing the software of the present invention.

With reference still to FIG. 9, embedded computer 804 includes an address/data bus 951 for communicating information, one or more central processors (CPUs) 953 coupled with the bus 951 for processing information and instructions, a volatile memory (e.g., random access memory RAM) 952 coupled with the bus 951 for storing information and instructions for the CPU 953, and a non-volatile memory (e.g., read only memory ROM) 954 coupled with the bus 951 for storing static information and instructions for the CPU 953. Also included in the embedded computer 804 is a system interface unit 955 for interfacing bus 951 with bus 706, DSP 803, input-output unit 805, and display 806.

Figure 10:
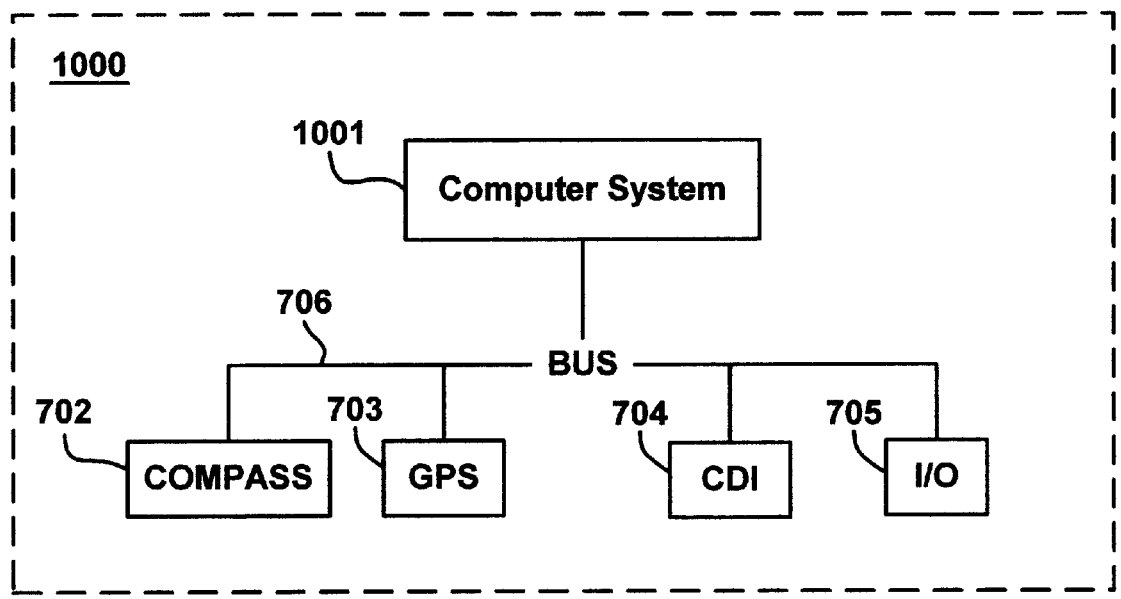
FIG. 10 shows a system in accordance with one alternative embodiment of the present invention.

With reference now to FIG. 10, a system 1000 in accordance with one alternative embodiment of the present invention is shown. System 1000 is substantially the same as system 700 with the exception of a discreet computer system 1001. Computer system 1001 is included to provide a separate, discreet computer system platform for the software of the present invention. It should be noted that computer system 1001 is substantially similar to embedded computer 804 (e.g., having a RAM and ROM coupled to a CPU via a bus). Computer system 1001 is, however, a separate component as opposed to being embedded within one of the other components of the system of the present invention.

Figure 11:
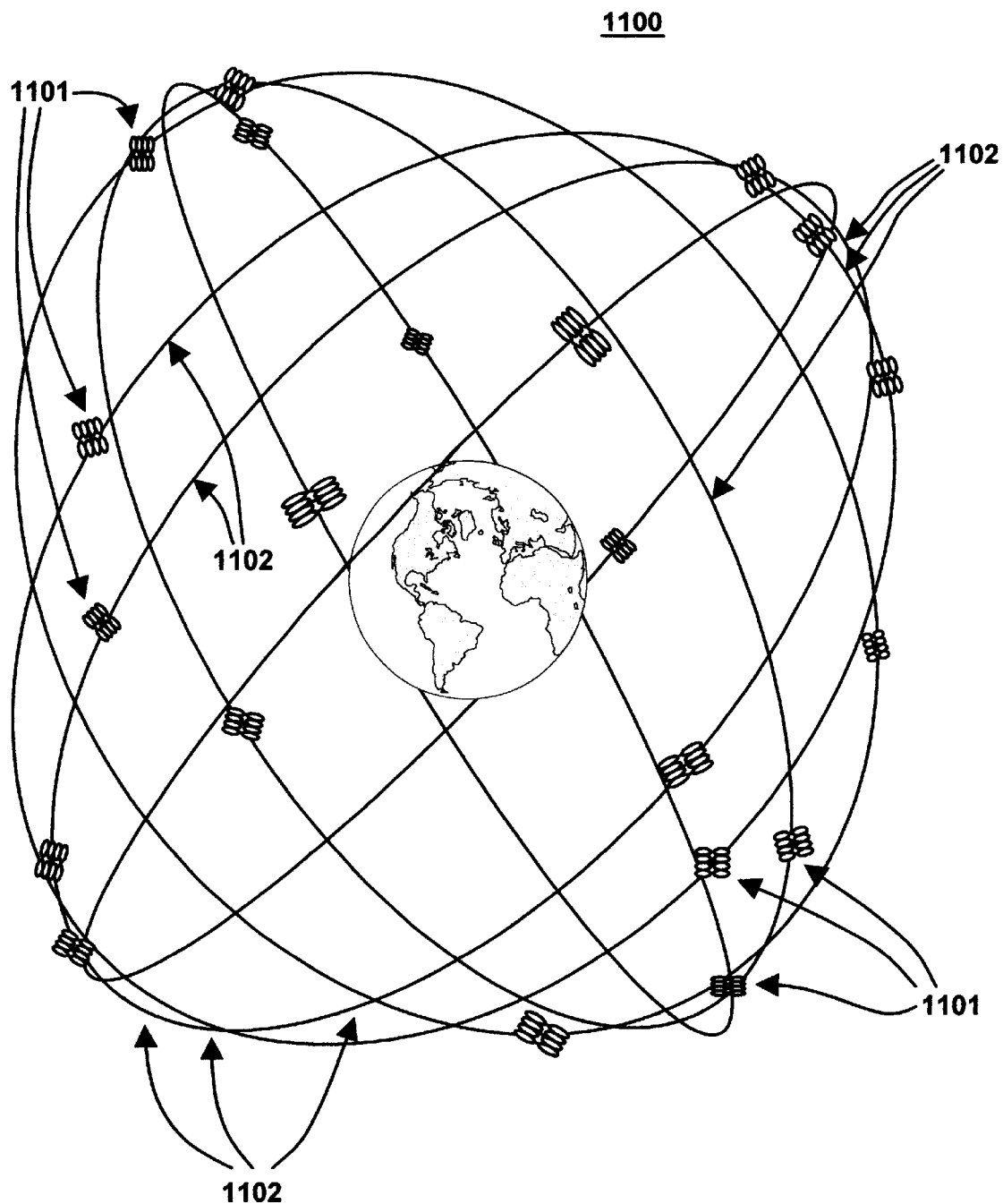
FIG. 11 shows a diagram of the constellation of GPS satellites in orbit as used by the DGPS receiver of the present invention.

FIG. 11 shows a constellation 1100 of GPS satellites 1101 in orbit. As described above, the system of the present invention uses GPS satellites 1101 for navigation and positioning information. GPS satellites 1101 are located in six orbital planes 1102 with four of the GPS satellites 1101 in each plane, plus a number of "on orbit" spare satellites (not shown) for redundancy. The GPS satellites 1101 are located in orbital planes, having an inclination of 55 degrees relative to the equator and an altitude of approximately 20,200 km (10,900 miles), and typically complete an orbit in approximately 12 hours. This positions each of the GPS satellites 1101 in such a manner that a minimum of five of the GPS satellites 1101 are normally observable (above the horizon) by a user anywhere on earth at any given time.

The orbiting GPS satellites 1101 each broadcasts spread-spectrum microwave signals encoded with positioning data. The signals are broadcast on two frequencies, L1 at 1575.42 MHz and L2 at 1227.60 MHz, with the satellite ephemeris (positioning data in an earth-centered, earth-fixed coordinate system) modulated using bi-phase shift keying techniques. Essentially, the signals are broadcast at precisely known times and at precisely known intervals and are encoded with their precise time of transmission. A user receives the signals with a GPS receiver designed to determine an exact time of arrival of the signals and to demodulate the satellite orbital data contained therein. Using the orbital data, the GPS receiver determines the time between transmission by the satellite and reception by the receiver. Multiplying this time by the speed of light gives what is termed as the pseudo-range measurement of that satellite. By determining the pseudo-ranges of four or more satellites, the GPS receiver is able to determine its location in three dimensions, as well as a time offset which is used to generate a very precise time reference. Thus, a user equipped with a proper GPS receiver is able to determine his PVT (position, velocity, and time) with great accuracy, and use this information for very precise navigation, among other applications.

To improve the accuracy of GPS determined PVT, differential GPS systems have been developed and widely deployed (e.g., DGPS receiver 703 of FIG. 7). As is well known, differential GPS functions by observing the difference between pseudo range measurements determined from the received GPS signals with the actual range as determined from the known reference station point. The DGPS reference station determines systematic range corrections for all the satellites in view based upon the observed differences. The systematic corrections are subsequently broadcast to interested users having appropriate DGPS receivers. The corrections enable the users to increase the accuracy of their GPS determined position. Differential correction broadcasts are currently in wide use throughout the world. Tens of thousands of DGPS receivers have been built and are in operation.

An even more accurate technique for improving the accuracy of GPS is RTK (real-time kinematic). As is well known, RTK involves the use of two or more GPS receivers which are coupled via a communications link (usually RF based). The GPS receivers are spatially separated and communicate to resolve ambiguities in the carrier phase of the GPS signals transmitted from the GPS satellites. The resulting carrier phase information is used to determine an extremely precise position (e.g., within 2 to 3 centimeters). Thus, RTK GPS receivers are among the most accurate navigation and surveying instruments available. RTK and related areas of art are further described in U.S. Pat. No. 5,519,620 issued to Talbot et al., and U.S. Pat. No. 5,359,332 issued to Allison et al., which are both incorporated herein.

Thus, in the preceding discussions, the present invention is described using DGPS receivers to avoid unnecessarily obscuring aspects of the present invention. However, it should be noted that the system of the present invention is well suited to operation with either conventional GPS, the more accurate, yet more complex, RTK GPS receivers.

Figure 12:
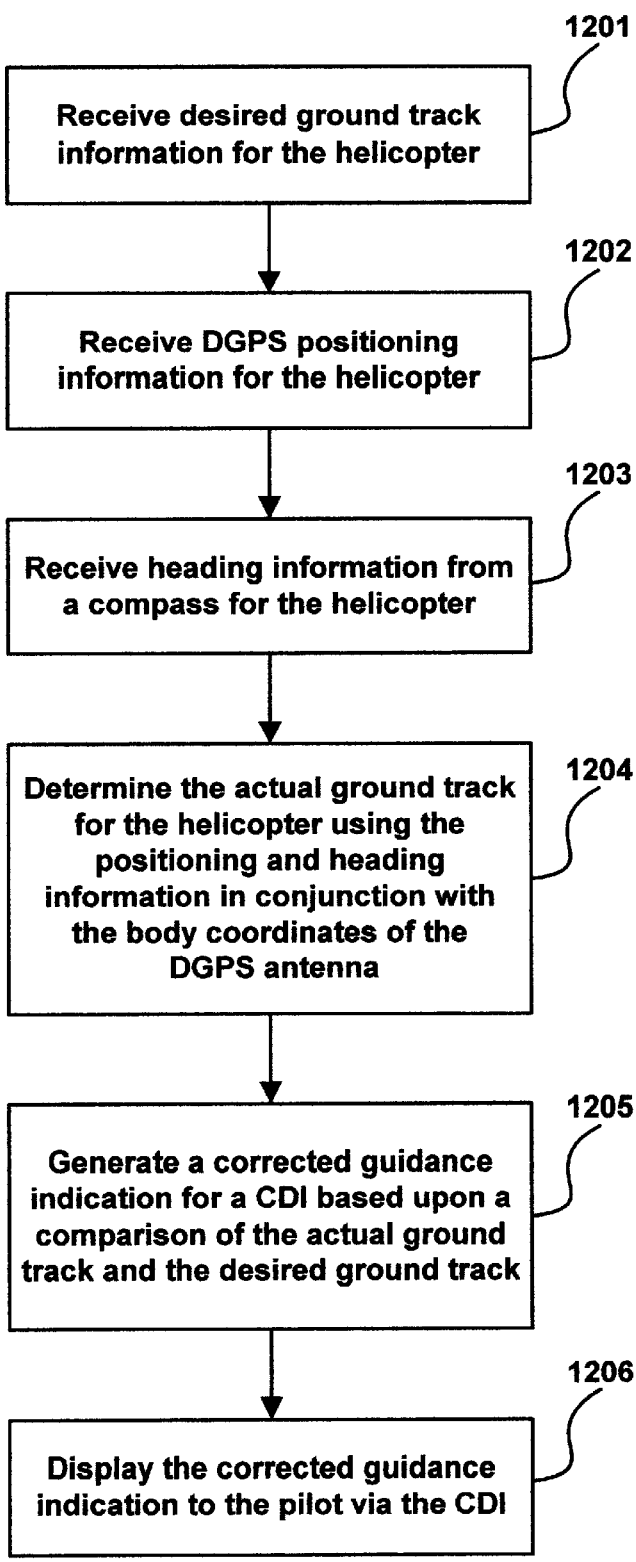
FIG. 12 shows a flow chart of the steps of a guidance process in accordance with one embodiment of the present invention.

FIG. 12 shows a flow chart of the steps of a process 1200 in accordance with one embodiment of the present invention. As depicted in FIG. 12, process 1200 shows the steps of the operating process of a DGPS guidance system (e.g., system 700 of system 7) in accordance with one embodiment of the present invention as it provides corrected guidance indications to a helicopter pilot, for example, as the pilot crop dusts an agricultural field.

Process 1200 begins in step 1201, where a guidance system in accordance with one embodiment of the present invention (e.g., system 700) receives desired ground track information for the helicopter. This information can be entered, for example, by the pilot (e.g., programming a series of way points) or up-loaded from an external device (e.g., transferred to the system via the I/O device 705.

In step 1202, system 700 receives DGPS positioning information from the included DGPS receiver (e.g., DGPS receiver 703). As described above, this positioning information is determined with respect to the location of the antenna, which, in the case of helicopters, is typically a tail boom mounted location (e.g., to clear the obscuration of the spinning rotor blades).

In step 1203, system 700 receives heading information from the included compass (e.g., compass 702). As described above, the compass information is used to compensate for the offset of the DGPS antenna (e.g., DGPS antenna 303).

In step 1204, the embedded computer system built into DGPS receiver 703 computes the actual ground track of the helicopter. As described above, the DGPS positioning information and the heading information is used in conjunction with the body location of the DGPS antenna to determine the actual ground track of the helicopter. The DGPS coordinates are expressed in terms of ECEF coordinates, the heading is expressed with respect to the North direction of the NED coordinates, and the location of the DGPS antenna 303 with respect to the center of the helicopter is expressed in terms of body coordinates. As described above in the discussions of FIGS. 4–6, a series of transformations are performed by embedded computer system 804 (shown in FIG. 8) to correlate the information. The result of these calculations is the actual ground track of the helicopter, taking into account the offset due to the mounting location of the DGPS antenna 303.

In step 1205, a corrected guidance indication for a CDI is generated based upon a comparison of the actual ground track and the desired ground track.

Then, in step 1206, the corrected guidance indication is displayed on the CDI (e.g., CDI 350 of FIG. 3) for the pilot. Using this guidance indication, the pilot is able to make the desired corrections to the helicopters course to maintain the desired ground track, even in the presence of cross winds.

Thus, the present invention provides a solution for compensating for the offset caused by the mounting location of a GPS antenna on a vehicle. The present invention can be efficiently implemented and does not require the installation of additional expensive hardware (e.g., GPS antennas, inertial measurement systems, etc.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method for correcting yaw in a GPS (global positioning system) based guidance system mounted on a vehicle, the method comprising the steps of:
    a) determining a ground track using a GPS receiver;
    b) determining heading using a compass mounted on the vehicle;
    c) determining a difference between the ground track and the heading; and
    d) generating an indication operable for directing a vehicle to maintain a desired ground track using the difference, wherein the generating compensates for the difference between the ground track and the heading.

2. The method of claim 1 wherein the vehicle is a helicopter having a tail boom and a GPS antenna for the GPS is mounted on the tail boom.

3. The method of claim 2 wherein the generating compensates for a yaw of the vehicle as the vehicle proceeds along the ground track.

4. The method of claim 3 wherein the generating compensates for an offset of the GPS antenna with respect to the ground track, the offset caused by the yaw.

5. The method of claim 1 wherein the GPS receiver is a differential GPS receiver operable for receiving differential corrections to generate differentially corrected position data.

6. The method of claim 1 wherein the compass is a flux gate compass.

7. A method for generating corrected CDI (course deviation indicator) guidance indications operable for compensating for vehicle attitude with respect to an actual ground track, the method comprising the steps of:
    a) receiving a desired ground track for the vehicle;
    b) receiving positioning information using a DGPS (differential global positioning system) receiver;
    c) receiving heading information using a compass mounted on the vehicle;
    d) determining an actual ground track for the vehicle using the positioning information from step b) and the heading information from step c) wherein the determining compensates for the heading of the vehicle as the vehicle proceeds along the actual ground track;
    e) determining a difference between the actual ground track and the desired ground track; and
    f) generating an indication operable for directing a vehicle to maintain a desired ground track using the difference, the indication adapted for display on a CDI, wherein the indication is corrected for the attitude of the vehicle.

8. The method of claim 7 wherein the vehicle is a helicopter having a tail boom and a DGPS antenna for the DGPS receiver is mounted on the tail boom.

9. The method of claim 8 wherein step c) compensates for a yaw of the vehicle as the vehicle proceeds along the actual ground track.

10. The method of claim 9 wherein step c) compensates for an offset of the DGPS antenna with respect to the ground track, the offset caused by the yaw.

11. The method of claim 7 wherein the DGPS receiver is an RTK (real time kinematic) DGPS receiver.

12. The method of claim 7 wherein the vehicle is a boat and a DGPS antenna for the DGPS receiver is mounted at a location away from the center of the boat.

13. A system for correcting yaw in a GPS (global positioning system) based guidance system mounted on a vehicle, comprising:
    a GPS receiver for determining a ground track, the ground track determined with respect to a GPS antenna of the GPS receiver, the GPS antenna located away from a center of the vehicle;
    a compass mounted on the vehicle for determining a heading of the vehicle, the compass coupled to the GPS receiver, the GPS receiver operable for determining a difference between the ground track and the heading; and
    a course deviation indicator coupled to the GPS for generating an indication operable for directing the vehicle to maintain a desired ground track using the difference, wherein the desired ground track is maintained with respect to the center of the vehicle, wherein the generating compensates for an offset between the ground track and the desired ground track.

14. The system of claim 13 wherein the vehicle is a helicopter having a tail boom and the GPS antenna for the GPS is mounted on the tail boom.

15. The system of claim 13 wherein the generating compensates for the offset of the GPS antenna with respect to the desired ground track, the offset caused by a yaw.

16. The system of claim 13 wherein the GPS receiver is a differential GPS receiver operable for receiving differential corrections to generate differentially corrected position data.

17. A system for correcting GPS (global positioning system) offset due to GPS antenna location and vehicle yaw, comprising:
- a GPS receiver for determining a ground track, the ground track determined with respect to a GPS antenna of the GPS receiver, the GPS antenna located away from a center of the vehicle;
- a compass mounted on the vehicle for determining a heading of the vehicle, the compass coupled to the GPS receiver, the GPS receiver operable for determining a difference between the ground track and the heading; and
- a computer system configured to receive the heading and the ground track, the computer system further configured to compute an offset due to a yaw of the vehicle and cancel the offset by generate a corrected guidance indication for a CDI (course deviation indicator).

18. The system of claim 17 wherein the vehicle is a helicopter having a tail boom and the GPS antenna for the GPS is mounted on the tail boom.

19. The system of claim 17 wherein the generating compensates for the offset of the GPS antenna with respect to the desired ground track, the offset caused by a yaw of the vehicle.

20. The system of claim 17 wherein the GPS receiver is a differential GPS receiver operable for receiving differential corrections to generate differentially corrected position data.

* * * * *